Figure 4:
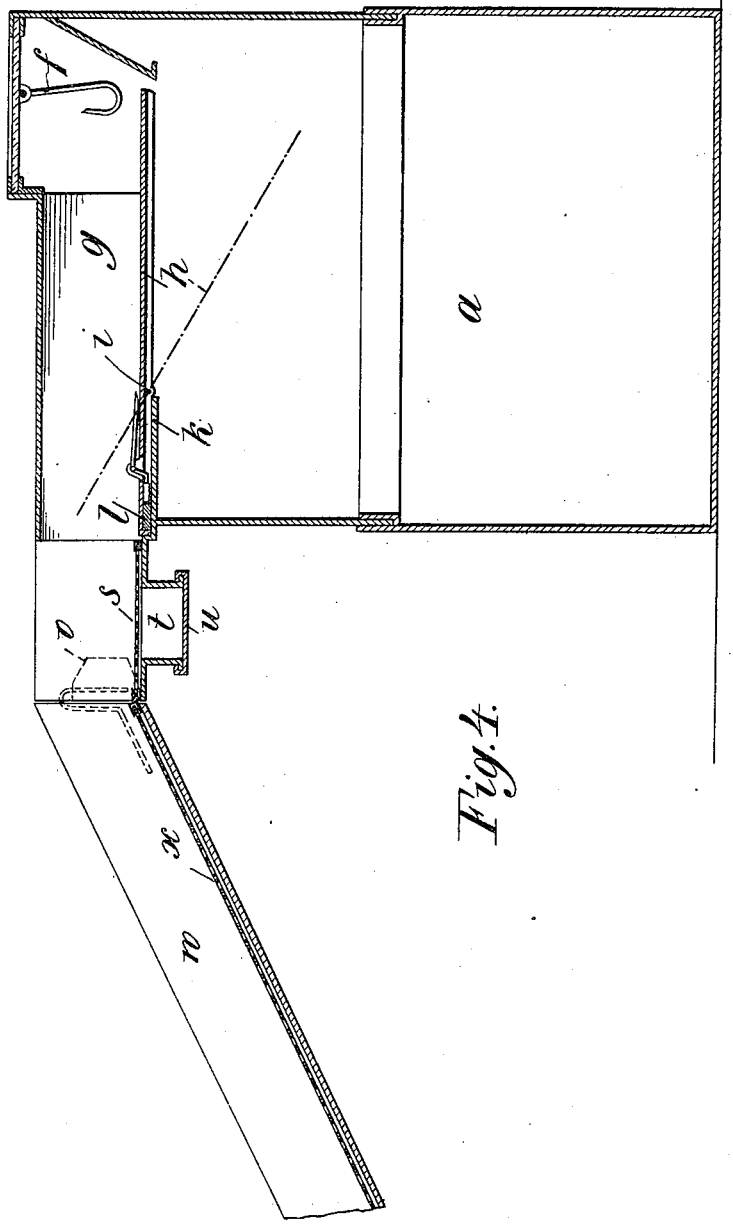

No. 666,233. Patented Jan. 15, 1901.
A. LINDEMANN.
ANIMAL TRAP.
(Application filed Mar. 23, 1900.)
(No Model.) 2 Sheets—Sheet 1.
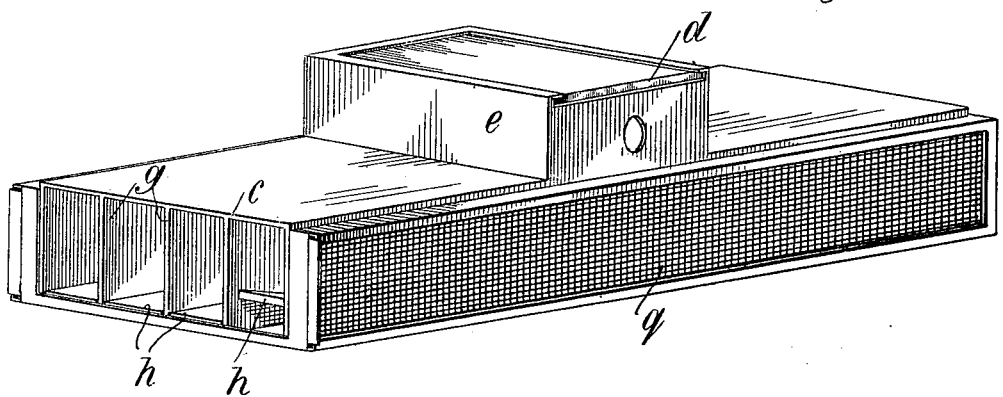
Fig. 1.
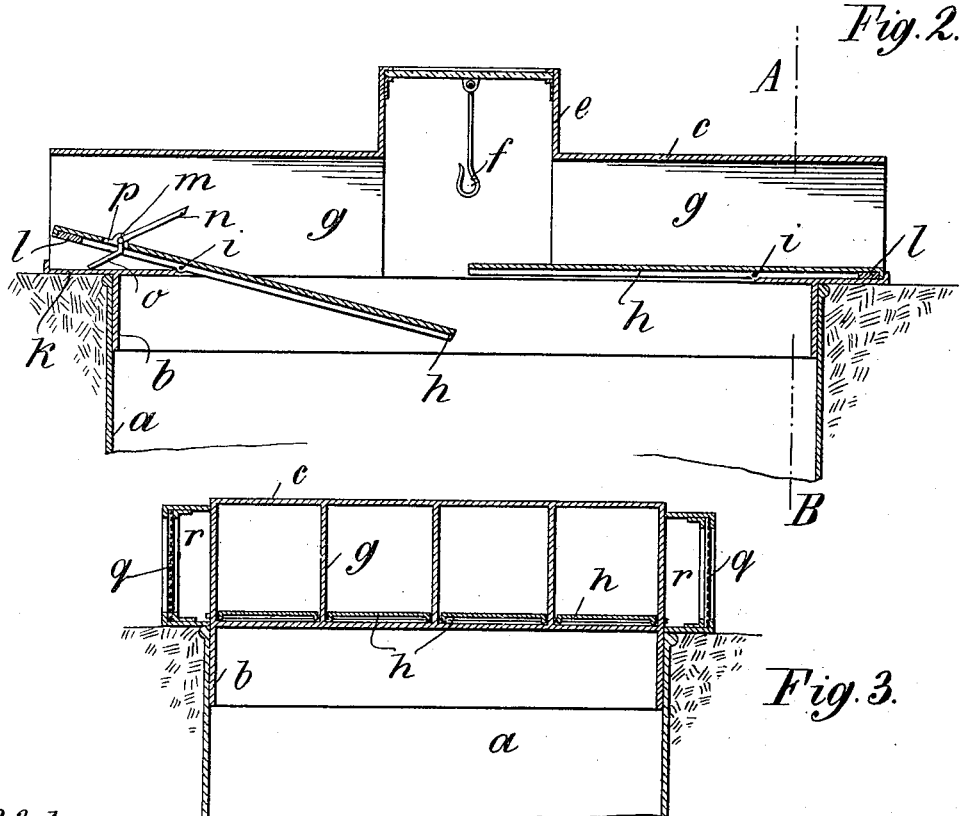
Fig. 2.
Fig. 3.
Witnesses:
Inventor:

No. 666,233. Patented Jan. 15, 1901.
A. LINDEMANN.
ANIMAL TRAP.
(Application filed Mar. 23, 1900.)
(No Model.) 2 Sheets—Sheet 2.

Witnesses:

Inventor:

UNITED STATES PATENT OFFICE.

ANTON LINDEMANN, OF HANOVER, GERMANY.

ANIMAL-TRAP.

SPECIFICATION forming part of Letters Patent No. 666,233, dated January 15, 1901.

Application filed March 23, 1900. Serial No. 9,969. (No model.)

*To all whom it may concern:*

Be it known that I, ANTON LINDEMANN, merchant, a subject of the German Emperor, residing at No. 23 Cellerstrasse, Hanover, Germany, have invented new and useful Improvements in Animal-Traps, of which the following is a specification.

The present invention relates to certain new and useful improvements in animal-traps in which the trapped animals are precipitated into the receptacle by means of tipping passages or channels; and it has for one object to simplify and cheapen the construction and to render more efficient, durable, and serviceable in operation this class of animal-traps.

A special object of the invention is to improve the construction of the tipping passages or channels in such a manner that the animal which has entered one or the other of the tipping channels is invisible to other animals outside.

With these ends in view the invention consists in the peculiar combination and in the novel construction, arrangement, and adaption of parts, all as more fully hereinafter described, shown in the accompanying drawings, and then specifically defined in the appended claim.

Referring to the annexed drawings, Figure 1 illustrates a perspective view of my improved trap. Fig. 2 shows a vertical section through the trap. Fig. 3 illustrates a section on line A B of Fig. 2, and Fig. 4 shows a vertical section through a trap intended for domestic use for catching mice.

Into the vessel $a$ for the reception of the trapped animals the trap, fitted with a lower edge $b$ in accordance with the configuration of the vessel $a$, is inserted. On the center of the lid $c$ of the trap a dome $e$ is placed, transverse to the longitudinal direction thereof, said dome being closed by a slide $d$. In the dome $e$ the hooks $f$ for suspending the bait are arranged. The entrances to the trap are formed by vertical walls $g$, extending to dome $e$. In the various entrances the swinging bottom plates $h$ are located, which extend to the center of the dome $e$, beneath the bait-hooks $f$. These bottom plates $h$ are pivoted at $i$ to the edges of the cross-ledges $k$, a counterweight $l$ being provided on the external end of the plates $h$, so as to balance same. Between the external edge of the tipping plate $h$ and the pivots $i$ a transverse rod $m$ may be situated in eyes $y$, formed at the sides of said plate $h$. Spikes $n$, pointing toward the interior of the trap, are fitted on this transverse rod $m$, normally resting on the bottom plate $h$. Through an aperture $p$ in the tipping plate $h$, beneath the transverse rod $m$, a bar or tongue $o$ extends, which is linked to the rod $m$. At the two longitudinal sides of the trap receptacles $r$ are provided, which are covered by a wire gauze or netting $q$, said receptacles $r$ containing bait to attract the animals, this bait, however, being inaccessible to them.

My improved trap operates in the following manner: An animal, attracted by the sight or flavor of the bait in the trap, having entered one or the other of the passages leading to the bait suspended in the dome $e$, on passing the fulcrum $i$ of the tipping bottom $h$ causes the internal end of the latter to tip downward, so that the animal will slide off the bottom $h$ and be precipitated into the receptacle $a$. In the tipping of the bottom plate $h$ the front or external end of same is raised, so that the bar $o$, which, owing to its weight, remains resting on the plate $k$ or the ground, causes the transverse rod $m$ to which it is linked, and with same the spikes $n$, which are secured to the latter, to turn upward. This prevents the trapped animals from retreat from the passages, as in the attempt to escape they will encounter the sharp points of the spikes $n$, which causes them to turn back, so that they are forced to be precipitated into the receptacle $a$. As soon as the animal has reached the receptacle $a$ the tipping plate $h$, owing to the provision of the counterweight $l$, previously referred to, returns to its former position, which simultaneously causes the bar $o$ to turn the transverse rod $m$, and with same the spikes $n$, to their original positions on the bottom of the plate $h$. A special advantage of the trap as hereinbefore described consists in the external end of the bottom plate $h$ being tipped upward when in action, which prevents the animals outside the trap from witnessing the precipitation or disappearance of the trapped animals into the receptacle $a$.

In the construction of the somewhat-modified trap for domestic use illustrated in Fig.

4 in a vertical section the vessel *a* for the reception of the trapped animals is placed on the floor, and this trap is suitably provided with entrances on one side only. In front of the entrances a receptacle *t*, covered on top by a gauze lid *s*, is provided for the reception of the bait, access being had to the interior of this receptacle by the bottom slide *u*. Lateral ears *v* on the trap serve for hooking therein a gangway *w*, resting on the floor. To facilitate access to the trap, it is suitable to cover the gangway *w* with wire-gauze *x* or the like to prevent the animals from slipping off.

Having now particularly described and ascertained the nature of my said invention and in what manner the same is to be performed, I declare that what I claim is—

In an animal-trap of the kind referred to, the combination with a counterweighted tipping bottom for the passages affording access to the bait suspended in the interior of the trap, of a transverse rod pivoted in ears at the sides of said tipping bottom, of spikes linked to said transverse rod and of a heavy bar secured to the transverse rod and extending through an aperture in the tipping bottom so as to rest on the ground of the trap for the purpose of turning the spikes upward when the bottom is being tipped, substantially as described and shown.

In testimony whereof I have hereunto set my hand in presence of two subscribing witnesses.

ANTON LINDEMANN.

Witnesses:
　LEONORE KASCH,
　JAY WHITE.